(12) United States Patent
Kramer et al.

(10) Patent No.: US 6,276,115 B1
(45) Date of Patent: Aug. 21, 2001

(54) METHOD OF CUTTING AND PACKAGING FORMED LOIN CUTS

(76) Inventors: Lee Kramer, 6410 Blue Heron Cove, Memphis, TN (US) 38115; Roger S. Williams, P.O. Box 361, New Richmond, OH (US) 45157

( * ) Notice: Subject to any disclaimer, the term of this patent is extended or adjusted under 35 U.S.C. 154(b) by 0 days.

(21) Appl. No.: 09/357,035

(22) Filed: Jul. 20, 1999

Related U.S. Application Data

(63) Continuation-in-part of application No. 09/016,253, filed on Jan. 30, 1998, now abandoned.

(51) Int. Cl.[7] .............................. B65B 63/00; A22C 17/00
(52) U.S. Cl. .................................. 53/435; 53/240; 53/244; 53/250; 53/517; 83/39; 83/404; 452/149
(58) Field of Search .............................. 53/154, 155, 435, 53/445, 517, 168, 246, 244, 250, 240, 238, 237; 83/39, 104, 155, 932, 404; 452/151, 149

(56) References Cited

U.S. PATENT DOCUMENTS

| | | | |
|---|---|---|---|
| 3,466,835 | * | 9/1969 | Temple ................................... 53/154 |
| 3,631,908 | * | 1/1972 | Meltzer .................................. 83/155 |
| 3,711,895 | * | 1/1973 | Arendale . |
| 3,926,080 | * | 12/1975 | Bettcher ................................... 83/15 |
| 4,104,847 | * | 8/1978 | Glandon .................................. 53/473 |
| 4,338,704 | * | 7/1982 | Welton .................................. 53/435 |
| 4,468,839 | * | 9/1984 | Chittenden . |
| 4,630,428 | * | 12/1986 | Lesch ................................ 53/240 X |
| 4,688,297 | * | 8/1987 | Bartels .................................. 452/165 |
| 4,776,146 | * | 10/1988 | Whitehouse ....................... 53/250 X |
| 4,833,954 | * | 5/1989 | Jenkner .............................. 83/404 X |
| 5,045,022 | * | 9/1991 | Hazenbroek ........................ 452/165 |
| 5,299,409 | * | 4/1994 | Daane .................................... 53/240 |
| 5,525,103 | * | 6/1996 | White et al. ......................... 452/149 |

* cited by examiner

Primary Examiner—Stephen F. Gerrity

(57) ABSTRACT

A process for packaging selected traditional cuts of pork loin by cutting the whole pork loin at successive saw stations to form a predetermined number of traditional cuts and moving the formed traditional cuts to corresponding traditional cut locations. After a first traditional cut is formed at the first saw station, the remainder of the whole loin is positioned at another saw station where a differing traditional cut is formed. The process is continued at additional saw stations so that the entire loin is formed into traditional cuts, the cuts are collected at collecting locations, and an array of cuts are placed in a package tray. The package is then sealed and can be gas flushed and thereafter accumulated in bulk or cases for removal to a remote location where they can be refrigerated or frozen.

12 Claims, 3 Drawing Sheets

METHOD OF CUTTING AND PACKAGING FORMED LOIN CUTS

This application is a continuation-in-part of my application Ser. No. 09/016,253 filed Jan. 30, 1998 (now abandoned).

BACKGROUND OF THE INVENTION

1. Field of the Invention

The present invention relates to cutting and packaging formed traditional cuts of pork and more particularly to an efficient process of selectively cutting a whole pork loin into traditional cuts at successive saw stations, moving the cuts to collecting locations, and packaging the traditional cuts in a package tray in a preselected combination.

2. Description of the Prior Art

Historically and to date there has been no established procedure for cutting pork loins into the various traditional cuts and thereafter forming packages of preselected content. The operation has been mostly manual with individuals cutting loins into sections and then depositing the cut sections in an accumulation bin with similar and random cut sections. Thus packaging is thereafter developed by drawing the needed cuts from the various collection bins in no particular order, the individual packers moving from one bin to another to withdraw the needed cuts for the package being created.

Thus the traditional method of packaging such products is a random one driven by the pace of the individuals involved in forming the package. There is no programmed and reliable manner in which to provide production efficiency with this system.

There is a clear and urgent need for a controlled system of forming and packaging traditional cuts of loin that can be measured for efficiency and adjusted for greater output and reliability. It is to this need that the present invention is directed.

SUMMARY OF THE INVENTION

The present invention includes the creation and operation of a highly efficient production line designed to systematically receive a continuous supply of pork loins at saw stations, the stations having bandsaw means to slice the loins into desirable cuts. Preferably, each saw station is set up to cut a precise traditional cut from the whole loin. After cutting, the traditional cuts are moved to a collecting location positioned to receive only this traditional cut, for example a loin center, and no other cuts. The remainder of the whole loin is sent to another saw station where another different traditional cut is formed. This specific traditional cut goes to its corresponding traditional collecting location. The process continues with each subsequent saw stations forming a different traditional cut and these differing cuts gathered at collecting locations, each dedicated to receiving only one kind of traditional cut. A conveyer extends along and adjacent the collecting locations and moves package trays sequentially by each location. An operator works each collecting location and deposits one more of that collecting locations' traditional cut into the tray. Each collecting location operator contributes to the tray until it is filled, and it is then sealed and further handled in a variety of ways.

After a traditional cut such as a chop is taken from the whole loin at a saw station, the remainder of the loin is positioned on a separate conveyor and moved to the next saw station where the next traditional cut is formed. The process continues through each station until the whole loin is depleted.

A bone dust remover is positioned at each saw station to remove particles of bone when the loins are cut. Most loins to be sectioned into traditional cuts are bone-in, so dust removal is essential The process has greater flexibility than any known system in that it permits the creation of any desired package. It can produce a package of from 2 to 6 rib end chops, 2 to 6 loin end chops and any number of rib centers and any number of loin centers. Any configuration that suits the marketing needs of any demographic group or geographic area can be produced. The present process keeps the flow of forming package trays going continuously. In this manner, all of the product goes through the system and no product remains at the end of a shift.

In the present concept, the process paces the workers. If there is delay or backup at any station, the problem at that station is readily noted and steps can be taken to correct it. The process is machine paced rather than individually paced.

The present process more specifically includes sequentially moving whole pork loins along a directed path of travel near a plurality of saw stations, sawing each sequentially moving pork loin at the first of the plurality of saw stations to form a first traditional cut, conveying the first traditional cut to a first traditional cut collecting location while moving the remainder of the whole pork loin to the second saw station, sawing the remainder of the loin to form a second different traditional cut, moving the second traditional cut to a second collecting station while moving the remainder of the whole pork loin to the third of the plurality of saw stations where a third different traditional cut is formed. The third different traditional cut is moved to a third corresponding collecting station, and the remainder of the whole pork loin continues to move through each of the remaining saw stations which saw and form differing traditional cuts at each station until the pork loin is depleted. These differing traditional cuts are conveyed to separate collecting locations for each differing traditional cut. Sequentially moving package trays move on a conveyer along a preselected path of travel near the collecting locations where at least one traditional cut from each collecting location is placed in each moving tray until each tray is filled and a package is formed. The package is then sealed at a sealing station and can be either gas flushed at a subsequent station or moved directly to a carton forming station. The packages are collected for removal to a remote location and may be either refrigerated or frozen thereafter.

Thus there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the arrangement of the components set forth in the following description or illustrated in the drawings. The invention is capable of other embodiments and of being practiced and carried out in various ways.

It is also to be understood that the phraseology and terminology employed herein are for the purpose of description and should not be regarded as limiting in any respect. Those skilled in the art will appreciate that the concept upon which this disclosure is based may readily be utilized as the basis for designing other structures, methods and systems for carrying out the several purposes of this development.

It is important that the claims be regarded as including such equivalent methods and products resulting therefrom that do not depart from the spirit and scope of the present invention. The application is neither intended to define the invention of the application, which is measured by its claims, nor to limit its scope in any way.

Thus the objects of the invention set forth above, along with the various features of novelty which characterize the invention, are noted with particularity in the claims annexed to and forming a part of this disclosure. For a better understanding of the invention, its operating advantages and the specific results obtained by its use, reference should be made to the following detailed specification taken in conjunction with the accompanying drawings wherein like characters of reference designate like parts throughout the several views.

DETAILED DESCRIPTION OF THE PREFERRED EMBODIMENT

Figure 1:
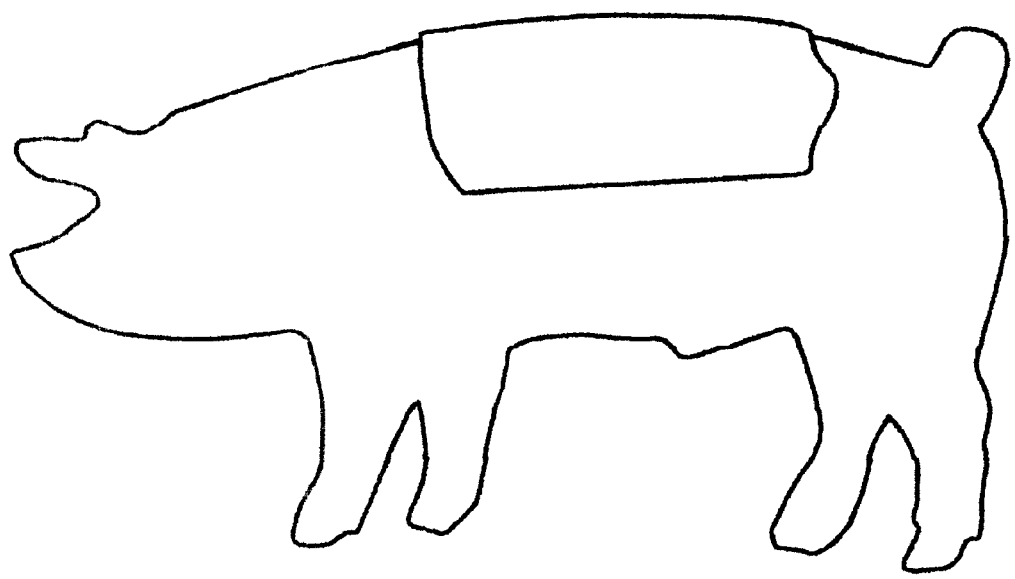
FIG. 1 is schematic outline of a hog with the loin portion of its body being emphasized as a darkened area.
Figure 2:
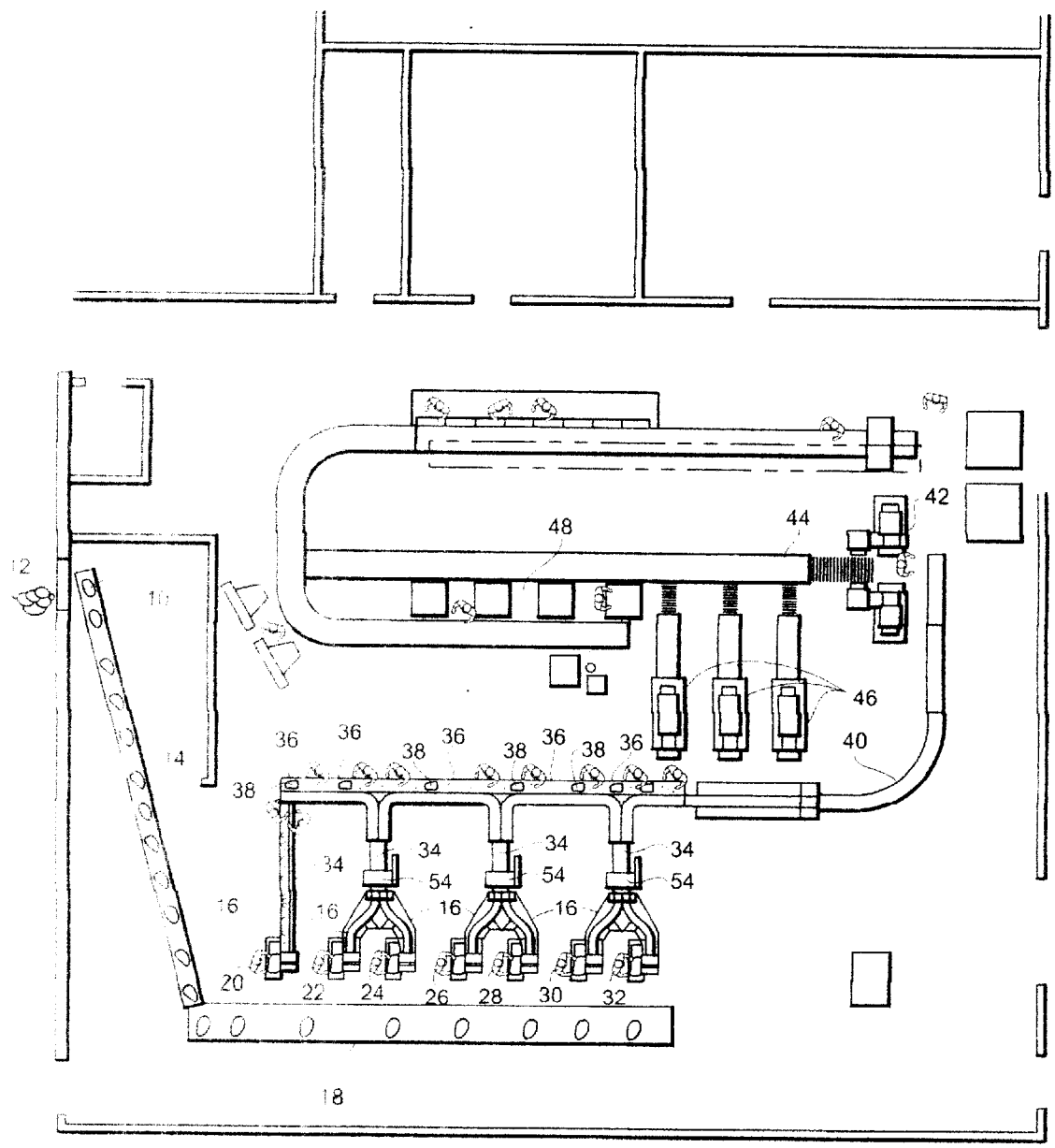
FIG. 2 is a schematic plan view of the work area used in practicing the process of the present invention.

The process comprising the present invention is best illustrated in the schematic working area diagram of FIG. 2 wherein whole pork loins 10 from a supply source 12 are placed on conveyer 14 and moved in the direction of a plurality of saw stations 16. Each station 16 is set up to form one single traditional cut of loin. Such cuts include sirloin end chops, country ribs, rib chops, rib centers and loin centers all coming from whole pork loins. While a saw station may be assigned a different traditional cut on any given working day depending on the package to be formed by the plant that day, while one package order is being cut, a saw station cuts only one traditional cut for that order.

When whole pork loins 10 move to the end of conveyer 14, they engage a separate conveyer 18 which operates continually along all saw stations 16. The function of conveyer 18 will be more fully appreciated as the cutting operation is described.

The operator 20 at first saw station 16 removes a whole pork loin 10 from conveyer 18 and forms the station's particularly assigned traditional cut for the production run. One or more of these traditional cuts may be formed depending on the size of the pork loin 10 and the thickness of the cuts desired. Once the cuts have been formed, operator 20 returns the remaining portion of the pork loin 10 to conveyer 18 and it moves down to the next saw station 16 where operator 22 collects it and cuts the particular traditional cut assigned to this saw station for the production run. After that cutting, operator 22 returns the remainder of the pork loin to conveyer 18 where it moves to the third saw station where it is collected by operator 24 who then produces another differing traditional cut assigned to that saw station for the production run. Operator 24 replaces the remainder of the pork loin on conveyer 18 where is moves on sequentially to the remaining saw stations where operators 26, 28, 30 and 32 perform in a similar manner, each cutting the particular traditional cut assigned to his station for that production run. The cut made at the last station by operator 32 depletes the balance of the original whole pork loin 10.

Additional conveyers 34 carry the formed traditional cut from saw stations 16 to a plurality of collecting locations 36. Each different traditional cut is moved to a single collecting location 36 devoted to collecting only that cut and manned by an operator who handles only that cut throughout the entire production run. Therefore at each collecting location, a plurality of similar traditional cuts are held so that the operator assigned to that station is able to handle that cut and to help form the tray filling process leading to the formation of the final package of a variety of traditional cuts.

A plurality of package trays is moved in a direction to cause them to pass close to each collecting location and enable the location's operator to position one or more traditional cuts from that location into tray 38. When tray 38 reaches the last collecting location, it is filled and ready for the final steps of packaging.

The filled package tray is then moved by conveyer 40 to a package sealing station 42 where it is shrink-wrapped or sealed. The sealed package then moves along another conveyer 44 and may be treated at gas flushing stations 46. The packages are them moved on to a casing or collecting area 48 where they are collected for subsequent movement to a remote location. The collection may be for refrigerating or freezing quantities of the complete packages in cases, pallets or otherwise.

Figure 3:
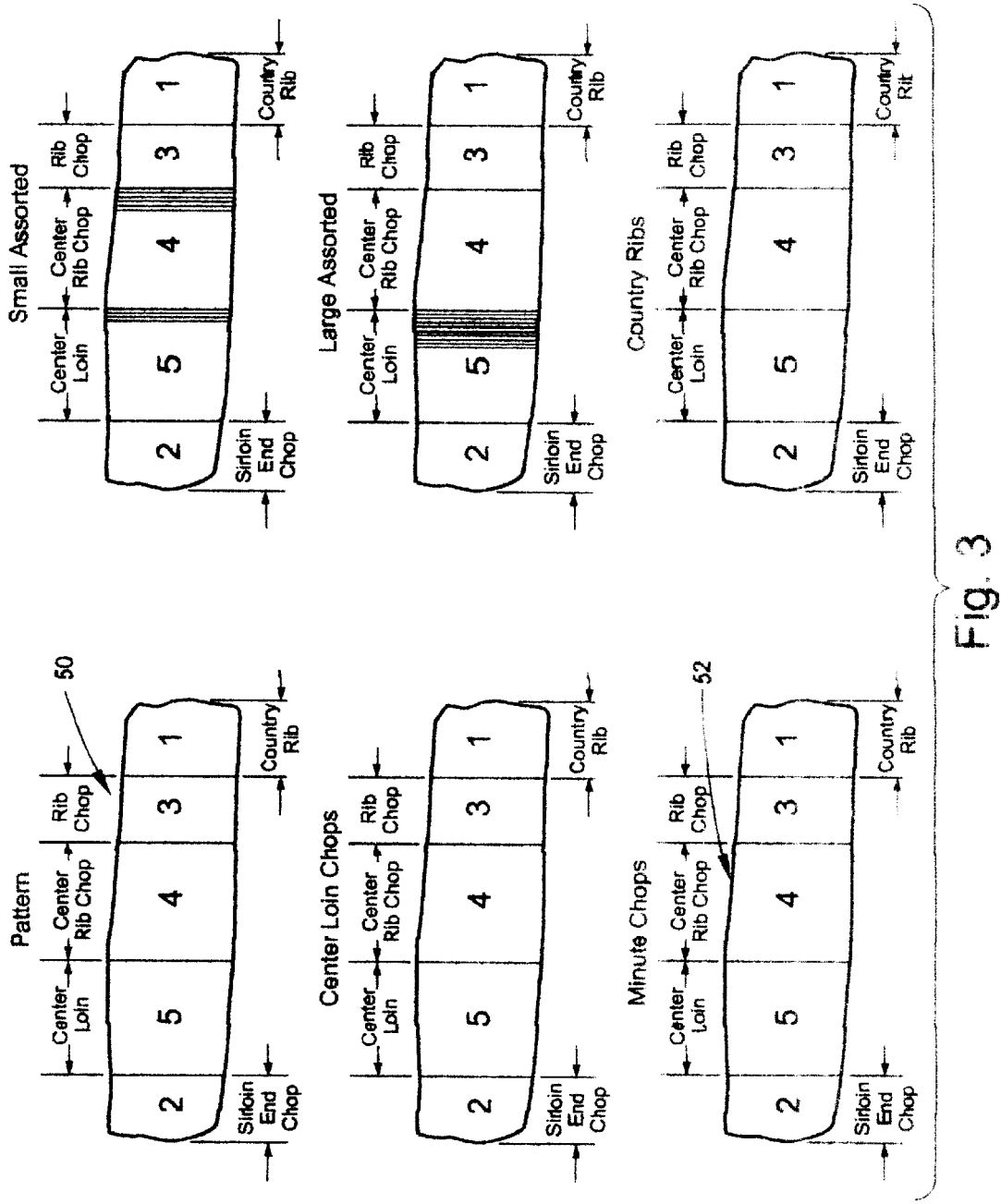
FIG. 3 is an array of pork loin traditional cuts collected in various packages by the packaging process of the present invention.

The various patterns possible shown in FIG. 3 include cuts forming a number of center loin chops shown generally as 50 of a somewhat larger than normal size or formed in minute cuts as shown at 52. As can be seen from FIG. 3, numerous variations in the packages can be created depending upon the demographics of the trading area or the geographic location of the customer. It is also apparent that this system can be expanded to provide more saw stations if such are necessary or it can be diminished by reducing the number of saw stations if space or economics so dictate.

Bone dust removers 54 are positioned in line with conveyers 34 so that the bone dust accumulated at each pair of saw stations 16 can be covered by a single remover 54.

Thus it can be seen that the present process keeps the flow of building trays going continuously. Although the product goes through the system, there is no product left over at the end of a shift as is the case under conventional practice where similar cuts are stacked together.

With respect to the present invention concept, it is to be realized that the techniques involved in practicing the novel process set forth herein and the components associated therewith are unlimited and are deemed readily apparent and obvious to one skilled in the art. All equivalent relationships to those illustrated in the drawings and described in the specification are intended to be encompassed herein. Therefore the following is considered as illustrative only of the principles of the invention. Since numerous modifications and changes will readily occur to those skilled in the art, it is not desired to limit the invention to the exact construction and operation shown and described. All suitable modifications and equivalents falling within the scope of the appended claims are deemed within the present day inventive concept.

What is claimed is:

1. A process for sectioning pork loins into preselected cuts and packaging the cuts in a preplanned and programmed packaged array comprising the steps of: sequentially moving whole pork loins along a directed path of travel adjacent a plurality of saw stations; sawing each sequentially moving pork loin at the first of the plurality of saw stations to form a first traditional cut; conveying the first traditional cut to a first traditional cut collecting location while moving the remainder of the whole pork loin to the second of the plurality of saw stations; sawing the remainder of the whole pork loin to form a second different traditional cut; conveying the second different traditional cut to a second collecting location while moving the remainder of the whole pork loin to the third of the plurality of saw stations; sawing the remainder of the pork loin to form a third different traditional cut; conveying the third different traditional cut to a third collecting station; continuing to move the remainder of the whole pork loin sequentially to each of the remaining saw stations sawing and forming differing traditional cuts at each remaining saw station until the pork loin is depleted; conveying the formed differing traditional cuts to separate collecting locations for each different traditional cut; sequentially moving package trays along a preselected path of travel located adjacent to the collecting locations; placing one or more traditional cuts from each preselected collecting location in the tray until each moving tray is filled and the preplanned package is formed.

2. The process as claimed in claim 1 wherein the pork loins are bone-in.

3. The process as claimed in claim 2 further comprising the step of sealing the formed package at a sealing station.

4. The process as claimed in claim 1 further comprising the step of sealing the formed package at a sealing station.

5. The process as claimed in claim 4 further comprising the step of moving the sealed packages to a remote location.

6. The process as claimed in claim 4 further comprising the step of cartoning the sealed packages.

7. The process as claimed in claim 6 further comprising the step of moving the cartoned sealed packages to a freezing area.

8. The process as claimed in claim 1 further comprising the step of removing bone dust from each saw station.

9. The process as claimed in claim 8 further comprising the step of sealing the formed package at a sealing station.

10. A process of forming customized packages of different traditional loin cuts from whole pork loins at a plurality of cutting stations and collecting locations comprising the steps of: forming each different traditional cut from a different whole pork loin at a corresponding traditional cut cutting station; positioning each formed traditional cut at a corresponding traditional cut collecting location; moving a package tray in a selected direction adjacent the collecting locations; and filling the tray with a preselected array of traditional cuts from the collecting locations.

11. The process as claimed in claim 10 further comprising the step of sealing the package tray and traditional cuts at a package sealing station.

12. The process as claimed in claim 10 further comprising the step of removing bone dust from the cutting stations.

* * * * *